United States Patent
Naccari et al.

(10) Patent No.: US 10,893,265 B2
(45) Date of Patent: Jan. 12, 2021

(54) VIDEO ENCODING AND DECODING WITH SELECTION OF PREDICTION UNITS

(71) Applicants: Matteo Naccari, London (GB); Andrea Gabrieliini, Surrey (GB); Marta Mrak, London (GB)

(72) Inventors: Matteo Naccari, London (GB); Andrea Gabrieliini, Surrey (GB); Marta Mrak, London (GB)

(73) Assignee: British Broadcasting Corporation, London (GB)

( * ) Notice: Subject to any disclaimer, the term of this patent is extended or adjusted under 35 U.S.C. 154(b) by 139 days.

(21) Appl. No.: 15/531,322

(22) PCT Filed: Nov. 27, 2015

(86) PCT No.: PCT/GB2015/053640
§ 371 (c)(1),
(2) Date: May 26, 2017

(87) PCT Pub. No.: WO2016/083840
PCT Pub. Date: Jun. 2, 2016

(65) Prior Publication Data
US 2017/0347092 A1    Nov. 30, 2017

(30) Foreign Application Priority Data
Nov. 27, 2014   (GB) .................................. 1421095.9

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/109* (2014.11); *H04N 19/119* (2014.11);
(Continued)

(58) Field of Classification Search
CPC combination set(s) only.
See application file for complete search history.

(56) References Cited

U.S. PATENT DOCUMENTS 5,561,477 A * 10/1996 Polit ..................... H04N 5/144
348/700
2013/0136175 A1 * 5/2013 Wang ................... H04N 19/176
375/240.12

(Continued)

OTHER PUBLICATIONS

International Search Report for Application No. PCT/GB2015/053640 dated Jan. 28, 2016 (3 pages).
Yuan et al: "Quadtree Based Nonsquare Block Structure for Inter Frame Coding in High Efficiency Video Coding," IEEE Transactions on Circuits and Systems for Video Technology, vol. 22, No. 12, Dec. 2012, 1707-1719.

(Continued)

*Primary Examiner* — Dave Czekaj
*Assistant Examiner* — Samuel D Fereja
(74) *Attorney, Agent, or Firm* — Michael Best and Friedrich LLP

(57) ABSTRACT

In video coding or decoding, coding blocks in a current frame are predicted from blocks in previously encoded frames with prediction samples and associated information organised in a prediction unit. A decision on which prediction unit type to consider for coding is made upon analysis of the distribution of a sum of absolute difference or other function of the residual signal over the block.

20 Claims, 2 Drawing Sheets

(51) Int. Cl.
*H04N 19/109* (2014.01)
*H04N 19/136* (2014.01)
*H04N 19/179* (2014.01)
*H04N 19/14* (2014.01)
*H04N 19/31* (2014.01)
*H04N 19/137* (2014.01)

(52) U.S. Cl.
CPC ........... *H04N 19/136* (2014.11); *H04N 19/14* (2014.11); *H04N 19/179* (2014.11); *H04N 19/31* (2014.11); *H04N 19/137* (2014.11)

(56) References Cited

U.S. PATENT DOCUMENTS

| | | | | |
|---|---|---|---|---|
| 2014/0140395 | A1* | 5/2014 | Kim | H04N 19/176 375/240.03 |
| 2014/0376634 | A1* | 12/2014 | Guo | H04N 19/52 375/240.16 |

OTHER PUBLICATIONS

Shi et al: "Fast Inter Mode Decision Using Residual Homogeneity in H.264/AVC," 2013 IEEE International Conference on Acoustics, Speech and Signal Processing (ICASSP); Vancoucer, BC; May 26-31, 2013, Institute of Electrical and Electronics Engineers, Piscataway, NJ, pp. 1384-1388.

Zheng et al: "Fast H.264/AVC to HEVC transcoding based on residual homogeneity," 2014 International Conference on Audio, Language and Image Processing, IEEE, Jul. 7, 2014, pp. 765-770.

Jia et al: "A fast intermode decision algorithm based on analysis of inter prediction residual," 2014 IEEE 16th International Workshop on Multimedia Signal Processing (MMSP), IEEE, Sep. 22, 2014, pp. 1-4.

Wang et al: "Image Quality Assessment: From Error Visibility to Structural Similarity," IEEE Transactions on Image Processing, IEEE Service Center, Piscataway, NJ, US, vol. 13, No. 4, Apr. 1, 2004, pp. 600-612.

* cited by examiner

VIDEO ENCODING AND DECODING WITH SELECTION OF PREDICTION UNITS

BACKGROUND OF THE INVENTION

This invention relates to video coding and decoding. In one aspect, the invention seeks to reduce the complexity associated with advanced coding techniques such as the High Efficiency Video Coding (HEVC) standard whilst retaining quality and efficiency.

HEVC is the new video compression standard jointly defined by ITU-R and ISO. It promises great improvements over its predecessor, AVC, especially for large format content, such as UHD. The greater compression efficiency comes with a much greater complexity. Practical implementations of HEVC must devise strategies to reduce the complexity without compromising the compression efficiency. In an important aspect, this invention addresses one particular area of the coder and decoder, namely residual prediction for both intra- and inter-frame coding.

SUMMARY OF THE INVENTION

There is provided a method of video coding or decoding in which coding blocks in a current frame are predicted from blocks in previously encoded frames with prediction samples organised in a prediction unit; wherein the decision on which prediction unit type to consider for coding is made upon analysis of the distribution of a function of the residual signal over the block.

Preferably, if said distribution is analysed to be uniform according to some candidate partitions for a given prediction unit, a decision is made to use the prediction unit in which all associated pixels are predicted in the same manner, without evaluation of the relative coding costs of said prediction unit and said candidate partitions.

The function may be a linear function. The function may be calculated separately over respective candidate partitions of a prediction unit. The distribution of a function of the residual signal may be formed as a measure of the homogeneity of the residual signal. The decision may be made upon analysis of the residual signal associated with the prediction unit where all associated pixels are predicted in the same manner.

The function may be selected from the group consisting of: sum of absolute difference, sum of square error, gradient, sum of transform difference and the Sobel operator.

A ratio may be computed between said function for the groups of samples associated with a given prediction unit type. Suitably, the prediction unit with candidate partitions associated with said ratio is not evaluated if said ratio is within a given tolerance threshold of unity. Also, the prediction unit where all pixels are computed in the same manner may be selected if said function is below a predetermined threshold value.

The function for respective groups of residual values associated with a given prediction unit may be scaled according to the different area occupied by the groups in an asymmetric prediction unit type. The function may be a measure of energy.

There is also provided video encoding apparatus and video decoding apparatus configured to implement such a method. Also provided is a computer program product containing instructions casing programmable apparatus to implement such a method.

DESCRIPTION OF PREFERRED EMBODIMENTS

Figure 1:
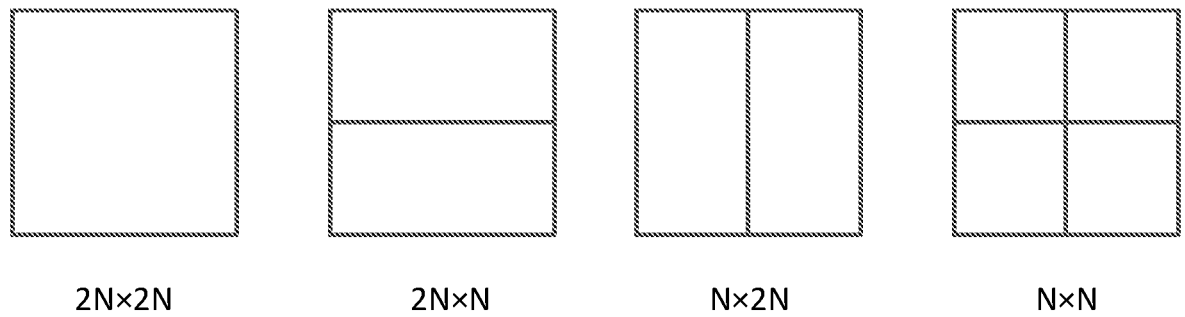
FIG. 1 illustrates four symmetrical prediction units specified by HEVC

There is disclosed a method of video coding or decoding in which coding blocks in a current frame are predicted from reference frames; such prediction is then used to compute a residual signal which is then transformed, quantised and entropy encoded. In HEVC, all the information associated with the prediction of each block is organised in the so-called Prediction Unit (PU). HEVC standardises different types of prediction units to define different modes to compute the predictor thus improving coding efficiency. To achieve the best compression performance, an HEVC encoder should test all available coding modes, i.e. all available prediction units, and select the one which optimises a given performance metric (hereafter denoted as coding cost). The computational complexity involved in computing the coding cost for each PU can be significant and a practical encoder should implement strategies to test only a subset of available prediction units which are the ones with the highest likelihood to bring the best coding performance.

For inter coding HEVC specifies eight different prediction units clustered into two groups: symmetric and asymmetric. In symmetric PUs the value for the associated pixels is computed either in the same way for all pixels or by dividing the pixels into groups obtained by splitting evenly the prediction unit in half along the horizontal or the vertical or both these dimensions. In asymmetric partitions the pixels are split unevenly into two groups along either the horizontal or vertical direction. There are two uneven splits for the horizontal and two uneven splits for the vertical direction.

The type of prediction unit eventually selected by the encoder depends on the content. Video content with large image areas with high motion activity generally requires splitting the prediction unit so that different predictions can be applied to different pixels to increase the accuracy of the predictor. Conversely, video content with large image areas where the motion content is low or smooth would instead require no split of the prediction unit.

For intra coding, HEVC specifies two different prediction units where in one the prediction samples are computed in the same way while in the other the samples are evenly split into four groups and a different prediction may be computed over each group. As for the case of inter coding, also for intra coding the type of prediction unit depends on the video content. In particular image areas with fine details will generally require a different predictor to be computed for each group of samples.

It is well known by those skilled in the art that in order to improve the compression efficiency a video codec should minimise the energy associated with the residual signal. For inter coding, a video codec such as the one standardised by HEVC has two dimensions to exploit: motion estimation and prediction unit partitioning. Motion estimation is the process to find the best prediction signal for each coding block by searching among the pixels in the reference frame. The partitioning for a prediction unit instead specifies whether the process of finding the best prediction is identical for all pixels in the unit and—if—not how it varies. By splitting, evenly or unevenly, a prediction unit may allow the energy of the residuals to be minimised, with the energy distribution of the residuals being more uniform over the split prediction units. For intra coding, the only dimension to exploit is the type of prediction unit the encoder will use for each coding block.

In both intra and inter coding, HEVC specifies the no split option for a prediction unit to allow minimal prediction information to be transmitted for those coding blocks with low or smooth motion content. This no split option is referred in the standard as 2N×2N prediction unit. The residual signal associated with the 2N×2N PU can be analysed to quantify its homogeneity and then decide whether other types of prediction units should be tested for the current coding block. It would be understood by the embodiments of this invention that the homogeneity of the residual signal for a 2N×2N PU can be quantified by grouping its samples into the same groups associated with the symmetric and asymmetric prediction units specified by HEVC. For those prediction units which split, evenly or unevenly, the sample into two groups, the ratio between the energies can be computed. If for a prediction unit type t the computed ratio is close to unity it means that the residual signal associated with a 2N×2N PU is also homogeneous with respect to prediction unit type t and so the encoder can omit to compute the coding cost for that prediction unit. For prediction units which split, evenly or unevenly, the residual samples into four groups, the two ratios associated with the vertical or horizontal splitting are computed. If both these ratios are close to unity it means that the residual signal associated with a 2N×2N PU is also homogeneous with respect to prediction unit types which split the pixels into four groups.

Figure 2:
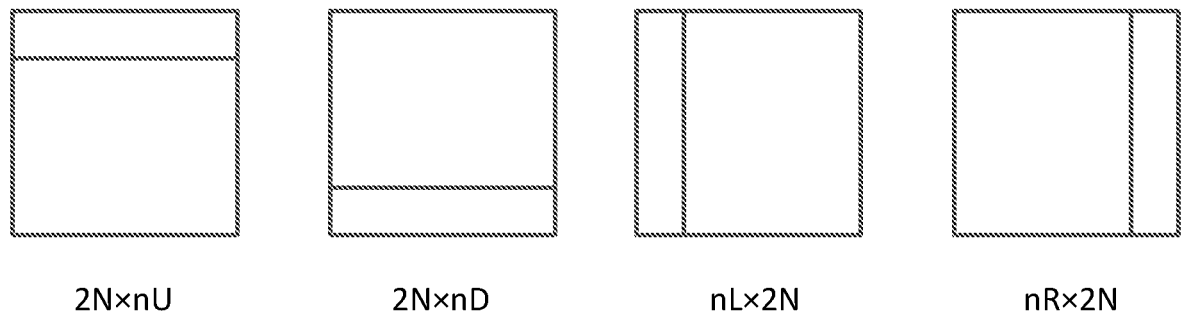
FIG. 2 illustrates four asymmetrical prediction units specified by HEVC

FIG. 1 shows the four different symmetric prediction unit types specific by HEVC. Two directions along which the split can be performed: horizontal and vertical and both of them can be used, leading to a prediction unit where four different predictions can be present. Each prediction unit carries the information associated with the processing required by the decoder in order to obtain the predictors. Examples of the information conveyed by a prediction unit can be the motion vectors, index for the reference frame and list of reference frames from which the prediction is computed. The splitting for the prediction units depicted in FIG. 1 always happens along the median horizontal or vertical line of each PU. The resulting prediction units for this symmetric splitting are denoted as 2N×2N, 2N×N, N×2N and N×N. FIG. 2 instead depicts four prediction units where the split of pixels happens along a non symmetrical horizontal or vertical line. These prediction units can be used to improve the compression over those image areas where the motion is unevenly distributed among all pixels belong to the current prediction unit. When the splitting is done along an asymmetric dimension, the resulting partitions are denoted as: 2N×nU, 2N×nD, nL×2N, and nR×2N.

In order to optimise the coding efficiency for a given coding block, the encoder can evaluate all prediction unit types and select the one which minimises the rate-distortion function, which often corresponds to minimisation of the energy of the residuals. Besides minimising the energy, a prediction unit also should provide a residual signal which has a specific structure, i.e. is homogeneous across all pixels belonging to the current coding block, so that the frequency transformation can efficiently pack the related coefficients. Evaluating whether the energy is uniformly distributed across all pixels can be a good criterion to established whether a given prediction unit is providing a satisfactory coding performance and omit the evaluation of the remaining prediction unit types. Prediction unit type 2N×2N can be used for this purpose since it does not requires any further splitting and therefore only one motion estimation process is required for the evaluation of its associated coding cost. After the residual signal associated with the 2N×2N PU is available, its energy can be assess to check for uniform distribution. If the energy is found to be uniformly distributed across the group of pixels associated with a prediction unit type t, then the evaluation of the coding cost for t can be omitted.

This invention describes a method which analyses the prediction residual signal associated with a prediction unit, e.g. 2N×2N, and quantifies the signal distribution, e.g. evaluates if the energy is uniformly distributed. An example of this analysis is associated with FIG. 3 which illustrates a 2N×2N PU where the associated pixels are organised into four groups A, B, C, and D. Over these groups the energy can be computed as the Sum of Absolute Differences (SAD). For a group (G) of residuals r the associated SAD is defined as:

$$SAD(G) = \Sigma_{r \in G} |r|$$

SAD is a linear operator, so summing $SAD_A$ and $SAD_B$ will give the SAD of the upper rectangle in a 2N×N partition. If the energy of the residuals is uniformly distributed, then the ratio $R_1$:

$$R_1 = \frac{SAD_A + SAD_B}{SAD_C + SAD_D}$$

should be close to 1. In this case the evaluation for partition type 2N×N can be omitted. In the same way if the ratio $R_2$:

$$R_2 = \frac{SAD_A + SAD_C}{SAD_B + SAD_D}$$

approximates 1 then the evaluation for partition type N×2N can be omitted too. While computing both ratio $R_1$ and $R_2$ some special cases should be handled properly. The first case is when both the numerator and the denominator in $R_1$ and $R_2$ are equal to zero. In this case the relative partition type is skipped since not only the energy is uniformly distributed but also partition 2N×2N has provided a good prediction for the associated coding unit. It should be noted that even when both the numerator and denominator are close to zero the evaluation of the associated partition can be skipped as well. The method described in this invention, uses a threshold k on the values for the numerator and denominator. Therefore if both the numerator and denominator of $R_1$ and $R_2$ are less than k their value is set to zero and the corresponding prediction unit is not evaluated. The second case to address is when the denominator is zero but not the numerator. In this case the corresponding partition should be evaluated since the energy is not uniformly distributed. The method described in this invention quantifies whether $R_1$ and $R_2$ are close to one by using a pre-determined tolerance T:

$$1 - T \leq R_m \leq 1 + T$$

where m can be 1 or 2. The computation of ratio $R_1$ and $R_2$ would require a division operation, possibly involving floating point arithmetic. However, the method described in this invention defines appropriate values for T so that the division can be avoided and integer arithmetic can be used instead. As an example, if T is set to 25% tolerance, then partition 2N×N is not evaluated if the following condition is satisfied:

$$(SAD_C + SAD_D) - \frac{(SAD_C + SAD_D)}{4} \le$$
$$SAD_A + SAD_B \le (SAD_C + SAD_D) + \frac{(SAD_C + SAD_D)}{4}$$

Figure 3:
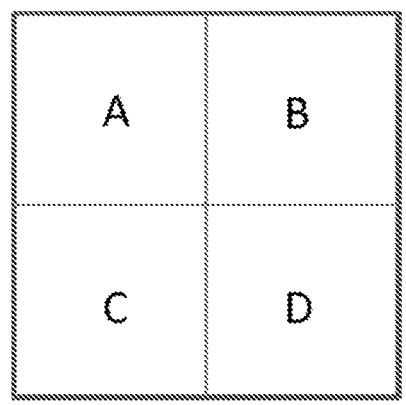
FIG. 3 illustrates the subdivision of a 2N×2N prediction unit into four groups of samples to compute the energy of the associated residual signal

In integer arithmetic, a division by 4 can be carried out as a right shift by two bits. If >> denotes the shift operation. The above condition translates into:

$$(D-(D>>2)) \le N \le (D+(D>>2))$$

where $N=SAD_A+SAD_B$ and $D=SAD_C+SAD_D$. The above condition also includes the case when the denominator is zero and therefore the corresponding partition should be evaluated. The method described in this invention can be summarised by the following sequence of steps:

Split the prediction residuals associated with the 2N×2N prediction unit into four groups denoted as A, B, C and D in FIG. 3.

Compute the SAD for A, B, C, and D

If $SAD_A+SAD_B$<k and $SAD_C+SAD_D$<k then do not evaluate PU type 2N×N

Figure 4:
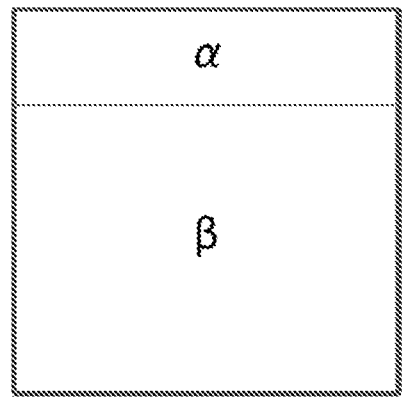
FIG. 4 illustrates the scaling factors to be applied for the computation of the energy of the residuals

Otherwise
  if $SAD_C+SAD_D-(SAD_C+SAD_D)>>2 \le SAD_A+SAD_B$
  and $SAD_A+SAD_B \le SAD_C+SAD_D+(SAD_C+SAD_D)>>2$ then do not evaluate PU type 2N×N
  else evaluate PU type 2N×N If $SAD_A+SAD_C$<k and $SAD_B+SAD_D$<k then do not evaluate partition type N×2N Otherwise
  if $SAD_B+SAD_D-(SAD_B+SAD_D)>>2 \le SAD_A+SAD_C$
  and $SAD_A+SAD_C \le SAD_B+SAD_D+(SAD_B+SAD_D)>>2$ then do not evaluate partition type N×2N
  else evaluate partition type N×2N The same methodology used for symmetrical prediction units can be also applied to quantify whether the evaluation for the coding cost associated with asymmetric prediction units should be omitted. The method described can take into account the different proportions between the two rectangles defined by the asymmetric PU type. FIG. 4 depicts the scaling factors α and β associated with prediction unit type 2N×nU. The ratio between the SAD values for its associated rectangles is:

$$\frac{SAD_\alpha}{SAD_\beta} \cdot \frac{3/4}{1/4}$$

The sequence of steps for symmetric prediction unit types can be also applied to quantify whether the residuals associated to a 2N×2N PU are also uniform for a 2N×nU PU, provided that the numerator for the ratio $R_1$ is multiplied by 3.

In some embodiments of this invention the SAD has been used. Different functions can of course be used, such as sum of square difference and sum of absolute transform difference. The distribution of these functions over the block can be analysed by forming separate values for the groups of samples corresponding with the respective candidate splits, or in other ways. Such separate values can be compared by the taking of ratios as described above or in other ways, such as the taking of differences.

Still further types of functions can be used, for example measures of structural similarity such as the objective metric proposed in Z. Wang, A. C. Bovik, H. R. Sheikh and E. P. Simoncelli, "Image quality assessment: From error visibility to structural similarity," IEEE Transactions on Image Processing, vol. 13, no. 4, pp. 600-612, April 2004.

In another embodiment, the decision on which prediction units to consider can be taken by considering the distribution of a measure of gradient computed over the residual signal. Thus, for example, the Sobel operator can be selected as approximation of the gradient associated to each residual sample. A measure of gradient provides for each sample two quantities: intensity and direction d for the maximum increase of one set of samples. From the direction of each residual sample in a coding block, the dominant direction of the Sobel operator can be computed over the same group of pixels A, B, C and D in FIG. 3. The dominant direction D can be defined as the average of the directions associated to each residual sample r as follows:

$$D = \sum_{r \in G} d(r)$$

where d(r) denotes the direction associated with r. Direction d(r) is given as:

$$d(r) = \arctan\left(\frac{S_y(r)}{S_x(r)}\right)$$

where $S_x(r)$ and $S_y(r)$ denote the Sobel operator values associated with r along directions x and y, respectively. Once the dominant directions $D_A$, $D_B$, $D_C$ and $D_D$ have been computed the same ratios $R_1$ and $R_2$ defined above can be computed and the decision on which prediction units to test can be taken as described in the above sequence of steps.

It should be understood that the present invention has been described by way of example and that a wide variety of modifications are possible without departing from the scope of claim. Thus it will be possible to analyse the distribution of a function of the residual signal over the block, in ways other than those specifically mentioned. Whilst the example of HEVC has been taken, the invention may have application to other coding arrangements where multiple prediction units are permitted.

The invention claimed is:

1. A method of video coding or decoding in which coding blocks in a current frame are predicted from a plurality of blocks in previously encoded frames with prediction samples organised in a prediction unit; comprising the steps of:
   determining a residual signal for the prediction unit based on a first prediction unit type extracted from a plurality of prediction unit types;
   organizing the residual signal into more than two groups based on location within the prediction unit;
   calculating, for each group, a function of the residual signal;
   determining a first parameter based on the calculated functions for one or more of the groups;

determining a second parameter based on the calculated functions for one or more of the remaining groups;

computing a ratio between the first parameter and the second parameter; and selecting one or more prediction unit types to consider for coding from a plurality of prediction unit types on the basis of the computed ratio.

2. A method according to claim 1, wherein when a distribution of the function of the residual signal is analysed to be uniform, the one or more prediction unit types to consider for coding are selected as prediction unit types in which all of a plurality of associated pixels are predicted in the same manner without evaluation of a relative coding cost of the prediction unit type.

3. A method according to claim 1, wherein the function of the residual signal is a linear function.

4. A method according to claim 1, wherein the function of the residual signal comprises a measure of a homogeneity of the residual signal.

5. A method according to claim 1, further comprising selecting, with an encoder, a decoder, or a codec, the prediction unit type based upon analysis of the residual signal associated with the prediction unit type where all of a plurality of associated pixels are predicted in the same manner.

6. A method according to claim 1, wherein the function of the residual signal is selected from the group consisting of: a sum of absolute difference, a sum of square error, a gradient, a sum of transform difference, and a Sobel operator.

7. A method according to claim 1, wherein selecting the one or more prediction unit types to consider for coding comprises determining that one or more prediction unit types can be omitted from consideration when the computed ratio is within a given tolerance threshold of unity.

8. A method according to claim 1, wherein selecting the one or more prediction unit types to consider for coding is based on whether the computed ratio is below a pre-determined threshold value.

9. A method according to claim 1, wherein the function of the residual signal is scaled for each group in dependence on an area occupied by the group.

10. A method according to claim 1, wherein the function of the residual signal is a measure of energy.

11. A method according to claim 1, wherein the first prediction unit type is a 2N×2N prediction unit type.

12. A method according to claim 1, wherein organising the pixels of the residual signal into groups comprises splitting the pixels of the residual signal horizontally and/or vertically in the prediction unit.

13. A method according to claim 12, wherein organising the residual signal comprises splitting the residual signal along a median horizontal and/or vertical line of the prediction unit.

14. A method according to claim 1, wherein selecting the one or more prediction unit types to consider for coding prediction unit type comprises omitting one or more prediction unit types from consideration in dependence on the computed ratio.

15. A method according to claim 1, comprising determining the first parameter as the sum of the calculated functions of a pair of adjacent groups.

16. A method according to claim 15, comprising determining the second parameter as the sum of the calculated functions of the remaining groups.

17. A method according to claim 15, wherein the function comprises a sum of absolute difference.

18. A method according to claim 1, wherein organising the residual signal into groups comprises organising the signal into four groups, and wherein the method comprises:

determining a first parameter as the sum of the calculated functions for a pair of two adjacent groups;

determining a second parameter as the sum of the calculated functions for the remaining two groups.

19. A non-transitory computer medium containing instructions causing a programmable apparatus to implement a method of video coding or decoding in which a plurality of coding blocks in a current frame are predicted from a plurality of blocks in a plurality of previously encoded frames with a plurality of prediction samples organised in a prediction unit; the method comprising:

determining, with an encoder, a decoder, or a codec, a residual signal for the prediction unit based on a first prediction unit type extracted from a plurality of prediction unit types;

organising the residual signal into more than two groups based on location within the prediction unit;

calculating, for each group, a function of the residual signal;

determining a first parameter based on the calculated functions for one or more of the groups;

determining a second parameter based on the calculated functions for one or more of the remaining groups;

computing a ratio between the first parameter and the second parameter; and selecting one or more prediction unit types to consider for coding from a plurality of prediction unit types on the basis of the computed ratio.

20. A method of video coding or decoding in which coding blocks in a current frame are predicted from a plurality of blocks in previously encoded frames with prediction samples organised in a prediction unit; comprising the steps of:

determining a residual signal for the prediction unit based on a first prediction unit type extracted from a plurality of prediction unit types;

organising the residual signal into four groups based on location within the prediction unit;

calculating, for each group, a function of the residual signal;

determining a first parameter as the sum of the calculated functions of a pair of two adjacent groups;

determining a second parameter as the sum of the calculated functions for the two remaining groups;

computing a ratio between the first parameter and the second parameter; and selecting one or more prediction unit types to consider for coding from a plurality of prediction unit types on the basis of the computed ratio;

wherein selecting the one or more prediction unit types to consider for coding prediction unit type comprises omitting one or more prediction unit types from consideration based on whether the computed ratio is within a pre-determined tolerance of 1.

* * * * *